INVENTOR.
J.OKUDA
BY Greene, Pineles & Durr
ATTORNEYS

Dec. 3, 1963 JIRO OKUDA 3,113,221
TIME DIVISION PULSE MEMORY SYSTEM EMPLOYING FREQUENCY
DIVIDER MEANS CONTROLLED BY BISTABLE CIRCUIT MEANS
Filed Nov. 15, 1960 2 Sheets-Sheet 2

INVENTOR.
J. OKUDA
BY Greene, Pineles & Durr
ATTORNEYS

United States Patent Office 3,113,221

Patented Dec. 3, 1963

3,113,221

TIME DIVISION PULSE MEMORY SYSTEM EMPLOYING FREQUENCY DIVIDER MEANS CONTROLLED BY BISTABLE CIRCUIT MEANS

Jiro Okuda, Tokyo, Japan, assignor to Nippon Electric Company, Ltd., Tokyo, Japan, a corporation of Japan Filed Nov. 15, 1960, Ser. No. 69,437
Claims priority, application Japan Nov. 18, 1959
9 Claims. (Cl. 307—88.5)

This invention relates generally to electronic computers, and more particularly to novel circuit arrangements for memorizing time division pulse positions in computer systems. The system of the invention relates to the type of circuits described in "Electronic Designer's Hand-Book," 1957, McGraw-Hill, pages 8–27 and 8–28, and in "Engineering Electronics" by John D. Ryder, 1959, McGraw-Hill, pages 293 and 294, and in other prior publications, and reference is herein made to the disclosures of these prior publications for simplifying the explanation of the present invention.

In an information exchange or transfer section of an electronic computer, a particular one of a first group (X) of circuits is often required to be related to a selected circuit of a second group (Y). In a physical or space-related system, detectors or gates at the intergroup circuit intersections readily afford such requisite memory or information transfer function. However, a more difficult condition exists in computer systems utilizing pulsed or synchronous timing operation.

The present invention is directed to simplified and effective circuitry for effecting information transfer or memory functions between selected circuits of two groups (X, Y) in a distributed time division computer system. In a large-capacity memory circuit, the resultant decrease in the number of components by the use of the present invention, is substantial. Furthermore, the principles and operation of the circuitry of the invention are applicable to general memory systems, digital computers, dial pulse computers, and the like.

It is among the objects of this invention to provide novel computer circuitry for memorizing time division pulse positions in information transfer operation.

Another object of the present invention is to provide simplified circuitry for memory exchange between individual circuits of two groups (X, Y) in electronic computers.

A further object of the present invention is to provide rugged, foolproof circuitry of solid-state components to effect information exchange in a time division pulse memory system.

The foregoing and other objects of the invention will be best understood from the following description of exemplifications thereof, reference being had to the accompanying drawings, wherein.

Figures 1, 2, 3, 4:
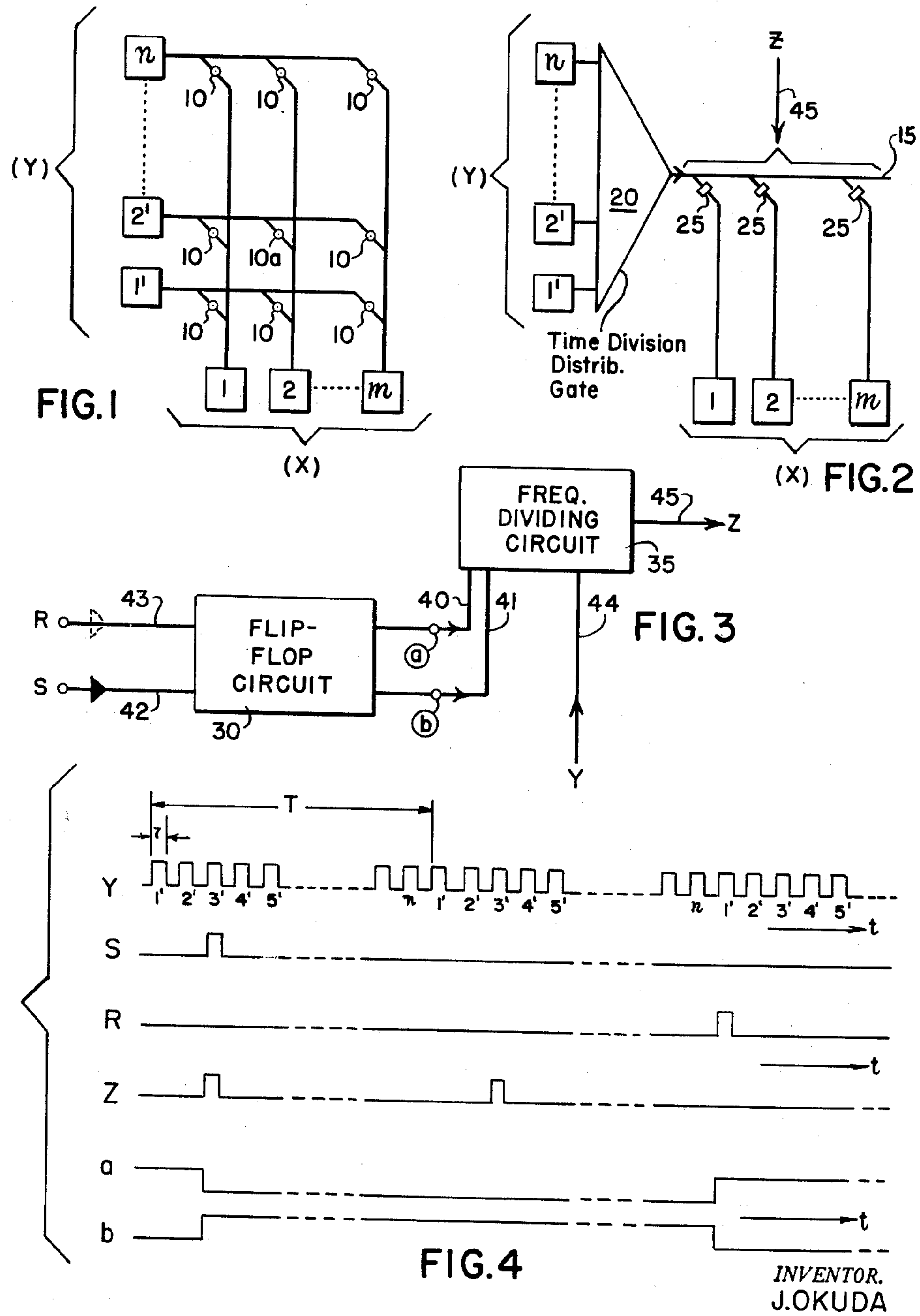
FIG. 1 is a schematic circuit diagram of a physical or space-integrated memory system.
FIG. 2 is a schematic circuit diagram of a time division pulse memory system, to which the invention circuitry applies.
FIG. 3 is a block circuit diagram of the invention arrangement.
FIG. 4 is a series of signal wave forms at several points in the exemplary circuit.

Referring now to FIG. 1, the (X) group of circuits 1, 2, . . . *m* are interrelated with a corresponding (Y) group 1′, 2′ . . . *n*, in a conventional cross-circuit array or "space division" system. At the respective circuital intersections are detectors or gates 10, 10. The information transfer or exchange occurring at the intersection, as at 10*a*, of two circuit components in simultaneous activation (or pulsed), renders such gate 10*a* conductive. The fired gate 10*a* is a memory action or function, directly effected by the physical interconnection of activated circuit sections, as is well known to those skilled in the art.

The system of FIG. 2, on the other hand, is on a synchronized or time division basis. The information of all the (Y) group circuit 1′, 2′ . . . *n*, are summed up in a multiple time division bus 15 by a time division distributing gate 20. The states of each circuit of the (Y) group appear on the bus 15 at the time position sequentially allocated thereto. At the intersection of the time division bus 15 and the circuits 1, 2 . . . *m* of group (X), are connected individual detector or transfer gates 25, 25. Thereupon, when it is desired that a circuit (*x*) of the group (X) should exchange information to be related with a circuit (*y*) of group (Y), the time division information transfer gate 25 at the intersection of the circuit (*x*) and the bus 15, is arranged to become conductive only at the time position allocated to the circuit (*y*) in the system time sequencing.

In the information transfer system of the present invention, it is necessary to memorize which circuit section of the (X) group is exchanging information with a particular circuit section of the (Y) group. Thus, in a time division information exchange system, for each transfer gate 25, a memory circuit is necessary that memorizes with which circuit of the (Y) group information is being exchanged (or that information is not being exchanged with any circuit). In the physical or space division exchange system referred to above, each gate 10 requires the function of memorizing whether to remain under a conductive state or a cut-off state.

Figure 5:
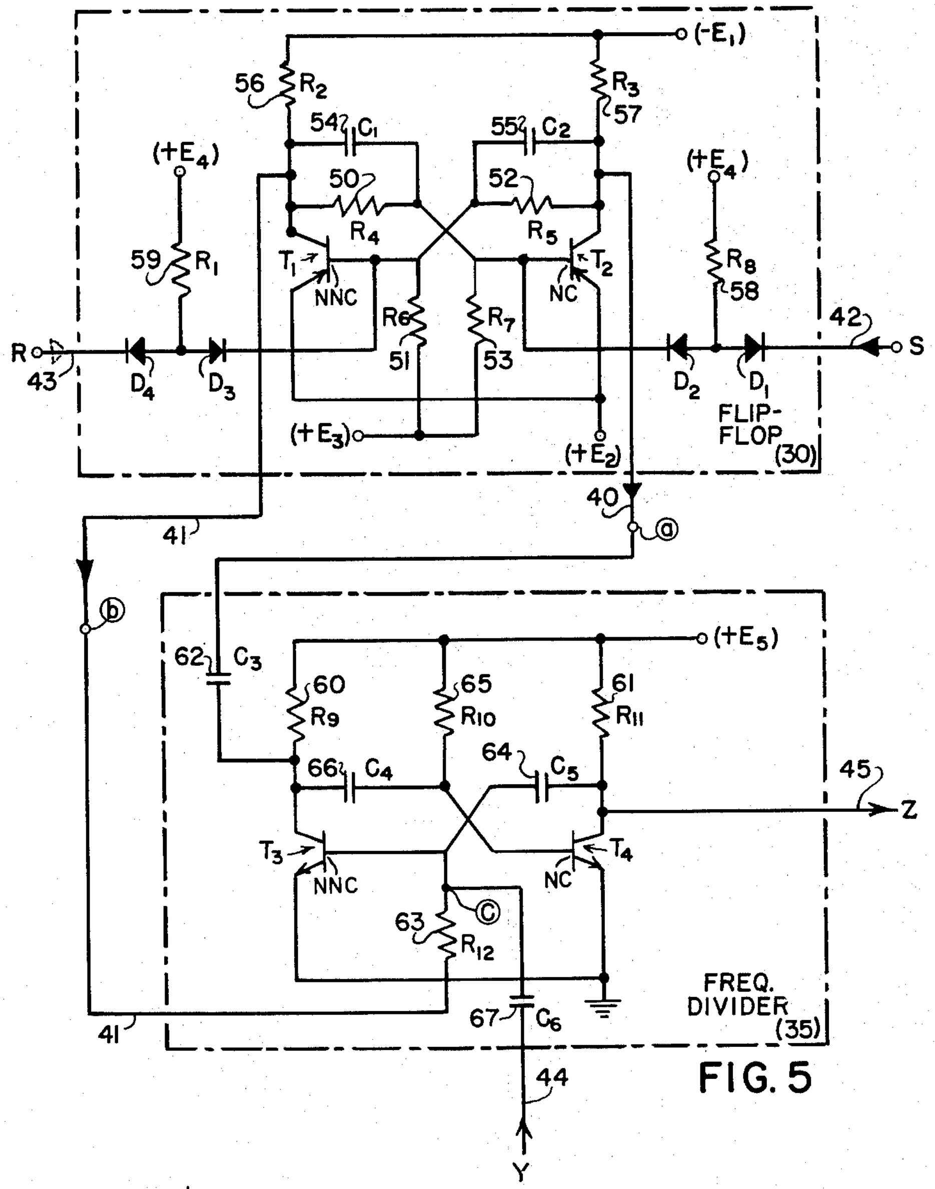
FIG. 5 is a diagram of the exemplary circuit.

The invention circuitry to effect the synchronous pulse switching or gating for the time division system of FIG. 2, is shown in block diagram form in FIG. 3, and in exemplary circuit form in FIG. 5. A flip-flop circuit 30 is interconnected in a novel and advantageous relation with a frequency dividing circuit 35. During one period of duration T covering the (Y) pulse sequence, *n* pulses occur, each of which corresponds to an individual circuit of the (Y) group, shown in FIG. 4. The timing of the frequency divider 35 is selected to be closely equal to the frame period T of the series of (Y) pulses 1′, 2′ . . . *n*.

With the flip-flop 30 in the reset state initially, we assume that the frequency divider 35 is in its "stop" condition upward control by flip-flop 30, as will be set forth in detail hereinafter. When the memory function is desired, related to a selected circuit (*y*) of the (Y) group, a start-up or "set" pulse S is initiated into the flip-flop circuit through lead 42. The pulse S phase or positon in the (Y) pulse sequence is synchronized with that of the selected (*y*) circuit element.

The start pulse S directly initiates the flip-flop 30 into its "set" state, which thereupon creates output signals *a* and *b* in lines 40, 41 to frequency divider 35. Signals *a* and *b* are oppositely phased, step pulses, as shown in FIG. 4. The frequency-dividing circuit 35 thereupon starts its timing function, initially sending out a pulse along the (Z) line 45 in phase with the *a* and *b* signals, and corresponding with the S signal pulse (see FIG. 4). The (Y) pulse series are impressed upon a predetermined point (*c*) in the divider 35, through lead 44, providing synchronous pulsing means therefor.

When a particular circuit element, e.g. the third (3′) of the (Y) group is desired for correlation by the (X) group, the S signal pulse is initiated in step with the third (3′) pulse position of the (Y) pulse series, as shown in FIG. 4 at the (Y) and (S) wave forms. Then, due to the starting operation of the frequency divider 35 and its synchronous initial pulse, the output pulses (Z) are obtained thereafter at the position 3′ in every period T, and in synchronism with the corresponding 3′ pulse. As will be understood by those skilled in the art, these (Z) pulse, timed sequence signals may now be used to operate the time division gates. When a reset pulse R is impressed on lead 43 to the flip-flop 30, the latter is returned to the "reset" state, placing the frequency divider 35 in the "stop" condition, and the output pulses from Z cease. Similarly, if a pulse S is thereupon sent at the pulse position 5′ of the (Y) pulse, a series of output pulses is obtained in lead 45 at every pulse position of 5′. It is thus evident that such circuit can memorize any pulse position in the (Y) pulse series.

The exemplary circuit, FIG. 5, is composed of solid-state diodes and transistors. The flip-flop section 30 contains two transistors $T_1$ and $T_2$, cross-connected through resistors 50–53 and condensers 54, 55. The transistor collectors are at proper negative source potential ($-E_1$) through dropping resistors 56, 57; the emitters, at a suitable positive potential ($+E_2$); and the bases, at the positive potential ($+E_3$) through corresponding resistors 51, 53. The start pulses S through lead 42 are impressed on the base of transistor $T_2$ through two cascaded, opposed diodes $D_1$ and $D_2$, held at a biasing potential ($+E_4$) through resistor 58. The reset pulses R through lead 43 are impressed on the base of the transistor $T_1$ through the similar diode circuit $D_3$, $D_4$ and resistor 59. The start and reset circuits 42, 43 thus do not interfere with the normal flip-flop circuit characteristics.

The frequency dividing circuit 35 which is an astable multivibrator is composed of two transistors $T_3$ and $T_4$, and two R-C timing sections to be described in detail. The two collectors are at the positive potential ($+E_5$) through decoupling resistors 60, 61. The *a* lead 40 from the collector of transistor $T_2$ of the flip-flop 30 couples to the collector of transistor $T_3$ through condenser 62. The *b* lead 41 from the collector of transistor $T_1$ connects to the base of transistor $T_3$ at point *c*, through resistor 63. The synchronous pulsed input (Y) series signals are impressed at the point *c* through the (Y) lead 44 and coupling condenser 67. The output frequency-divided, synchronous pulses Z of unit 35 are obtained at the collector of transistor $T_4$ through lead 45. Resistor 63 and condenser 64 form one timing section; resistor 65 and condenser 66, another.

In operation, when the transistor $T_1$ of the flip-flop circuit 30 is in its cut-off state (non-conducting), the opposite transistor $T_2$ is in its conducting state. The potential *b* of lead 41 is negative under such condition. Such negative potential *b* consequently renders transistor $T_3$ cut-off, and the corresponding action makes transistor $T_4$ conductive. During such conductive condition of transistor $T_4$, the drop through resistor 61 makes the potential of (Z) lead 45 nearly at ground or zero potential.

Under such conditions, if a "set" pulse S is applied at a (Y) pulse position, such as 3′ for example, of which a memory is desired, the flip-flop 30 is "set," transistor $T_1$ becoming conductive and transistor $T_2$ becoming cut-off. Now the *b* potential of lead 41 becomes positive and the base of transistor $T_3$ through resistor 63 is made positive. At that time, the negative step wave *a* of lead 40 appears at the collector of transistor $T_3$ through condenser 62 as a negative pulse which makes transistor $T_4$ cut-off and transistor $T_3$ conductive. The time constant of the R-C section 65, 66 is proportioned to produce, at the output Z-line 45, a pulse whose width is exactly $\tau$, namely a (Y) pulse width (see FIG. 4). Transistor $T_4$, which is now in the cut-off state, becomes conductive again after the time interval $\tau$, and transistor $T_3$ then becomes cut-off again due to capacitor 66 discharging through resistor 65.

Figure 6:
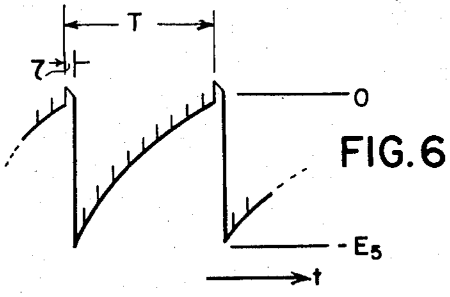
FIG. 6 is a wave form of a timing signal at a point in the circuit of FIG. 5.

The time constant R-C section 63, 64 is so selected as to make the time of cut-off state of transistor $T_3$ in the state of the synchronous pulse 3′ of (Y) entering at point *c*, exactly equal to $(T-\tau)$, as shown in FIG. 6. Exactly one period after reaching the cut-off state, and at a time or phase position synchronized with the selected pulse 3′ of (Y), transistor $T_3$ becomes conductive through the action of timing circuit 63, 64, and by the synchronous pulse from the point *c*. The transistor $T_4$ becomes cut-off. Thereafter, transistor $T_3$ becomes cut-off again after a time interval $\tau$, repeating the said operation. In this way, output (Z) pulses are obtained at lead 45 at a fixed pulse position, and once during every frame period T of a (Y) pulse series.

When the reset pulse R is impressed, flip-flop 30 is reset, transistor $T_1$ becomes cut-off, transistor $T_2$ becomes conductive, the potential of line *b* becomes negative, and the frequency divider 35 is put under the stop condition, with transistor $T_3$ remaining cut-off and transistor $T_4$ conductive. Thus the two (Z) pulses, in phase synchronism with the selected circuit of the (Y) group, and of identical pulse with $\tau$, are produced by the frequency divider 35 in its coaction with the flip-flop 30, as shown in FIG. 4. The initiation of the (Z) control signals for the computer is simply a start or "set" pulse S through lead 42, in phase with the desired circuit-elements pulse of the (Y) series. The frequency divider produces the synchronous pulses (Z) at lead 45 until the reset pulse R reaches flip-flop 30 along lead 43.

The circuit of FIG. 5 may be applied similarly with vacuum tubes. In the system of the present invention, if two frequency divider circuits are provided (with one flip-flop), and if two pulses series $n_1$ and $n_2$ are used ($n_1$, $n_2$ are prime each other) then $n_1 \times n_2$ memories are feasible. Consequently, if 100-pulse-position memories are required, 7-bit memory elements and translating gates will be required if memorized by a binary system. However, in the single divider system, the frequency dividing circuit can readily divide the frequencies into 11 pulses. Therefore, two frequency dividing circuits and one memory circuit with periods of $n_1=11$, and $n_2=10$, would be sufficient for the 100-pulse-position memory, with the elements corresponding to approximately 3 bits.

Although this invention has been described with an exemplary embodiment, it is to be understood that modifications in its circuitry and applications will occur to those skilled in the art. It is accordingly desired that in construing the breadth of the appended claims, they shall not be limited to the specific exemplifications of the invention described above.

I claim:

1. In a time division pulse memory system: a frequency dividing circuit for producing timed output pulse signals spaced apart by a time length T containing a timing means operative to substantially reproduce the system time division pulse widths $\tau$ wherein the pulse width is substantially less than the time length T, and a flip-flop circuit connected to said frequency dividing circuit and having a set and a reset state for controlling the start and stop operating conditions respectively of said dividing circuit said flip-flop circuit being adapted to continuously maintain said frequency dividing circuit in said start operating condition upon the occurrence of a set operation.

2. In a time division pulse memory system: a frequency dividing circuit for producing timed output pulse signals spaced apart by a time length T containing a timing means proportioned to substantially reproduce the system time division pulse widths $\tau$ wherein the pulse width $\tau$ is substantially less than the time length T, and a flip-flop circuit having a set and reset state connected to said frequency dividing circuit and including means for controlling the start and stop operating conditions respectively of said dividing circuit and the phase position of its output pulse signals, said flip-flop circuit being adapted to continuously maintain said frequency dividing circuit in said start operating condition upon the occurrence of a set operation, said timing section being of the resistor-condenser type and being operative to control the output pulses to the $\tau$ widths.

3. In a time division pulse memory system: a frequency dividing circuit for producing timed output pulse signals spaced apart by a time length T containing a first timing means operative to substantially reproduce the system time division pulse widths $\tau$, and a second timing means operative to substantially reproduce the total period T of a pulse series of a system circuit group wherein the pulse width $\tau$ is substantially less than the time length T, and a flip-flop circuit having a set and a reset state connected to said frequency dividing circuit for controlling the start and stop operating conditions respectively of said dividing circuit and the phase position of its output pulse signals said flip-flop circuit being adapted to continuously maintain said frequency dividing circuit in said start operating condition upon the occurrence of a set operation.

4. In a time division pulse memory system: a frequency dividing circuit for producing timed output pulse signals spaced apart by a time length T containing a first timing means operative to substantially reproduce the system time division pulse widths $\tau$, and a second timing means operative to substantially reproduce the total period T of a pulse series of a system circuit group less one pulse period $\tau$, wherein the pulse width $\tau$ is substantially less than the time length T and a flip-flop circuit having a set and a reset state connected to said frequency dividing circuit and including means for controlling the start and stop operating conditions respectively of said dividing circuit and the phase position of its output pulse signals said flip-flop circuit being adapted to continuously maintain said frequency dividing circuit in said start operating condition upon the occurrence of a set operation.

5. In a time division pulse memory system: a frequency dividing circuit for producing timed output pulse signals spaced apart by a time length T containing a first timing means operative to substantially reproduce system time division pulse widths $\tau$, and a second timing means operative to substantially reproduce the total period T of a pulse series of a system circuit group less one pulse period $\tau$, wherein the pulse width is substantially less than the time length T, and a flip-flop circuit having a set and a reset state connected to said frequency dividing circuit and including means for controlling the start and stop operating conditions respectively of said dividing circuit and the phase position of its output pulse signals, said first timing means being of the resistor-condenser type and being operative to control the output pulses to the $\tau$ widths, and said second timing means being of the resistor-condenser type and being operative to control the repetition rate of said output pulses to be in synchronism with a selected phase position thereof in the system.

6. In a time division pulse memory system: a frequency dividing circuit for producing timed output pulse signals spaced apart by a time length T containing a timing means operative to substantially reproduce the system time division pulse widths $\tau$ wherein the pulse width $\tau$ is substantially less than the time length T, and a flip-flop circuit connected to said frequency dividing circuit and having a set and a reset state for controlling the start and stop operating conditions respectively of said dividing circuit, said flip-flop circuit being connected to continuously maintain said frequency dividing circuit in said start operating condition upon the occurrence of a set operation, said flip-flop means being further connected to operate said frequency dividing circuit to its stop operation condition only upon the initiation of a reset operation.

7. In a time division pulse memory system: a frequency dividing circuit for producing timed output pulse signals spaced apart by a time length T containing a timing means operative to substantially reproduce the system time division pulse widths wherein the pulse width $\tau$ is substantially less than the time length T, and a flip-flop circuit connected to said frequency dividing circuit and having a set and a reset state for controlling the start and stop operating conditions respectively of said dividing circuit, said flip-flop circuit being connected to continuously maintain said frequency dividing circuit in said start operating condition upon the occurrence of a set operation, said flip-flop means being further connected to operate said frequency dividing circuit to its stop operation condition only upon the initiation of a reset operation, said flip-flop means being operable to its set state by a set pulse of suitable magnitude; said set state being self-maintained even upon the absence of said set pulse.

8. In a time division pulse memory system: a frequency dividing circuit for producing timed output pulse signals spaced apart by a time length T containing a timing means operative to substantially reproduce the system time division pulse widths $\tau$ wherein the pulse width is substantially less than the time length T, and a flip-flop circuit connected to said frequency dividing circuit and having a set and a reset state for controlling the start and stop operating conditions respectively of said dividing circuit, said flip-flop circuit being connected to continuously maintain said frequency dividing circuit in said start operating condition upon the occurrence of a set operation, said frequency dividing circuit including input means for receiving a pulse train of information signals which information signals are selected in time phase with the initiation of the start operating condition.

9. In a time division pulse memory system: a frequency dividing circuit for producing timed output pulse signals spaced apart by a time length T containing a timing means operative to substantially reproduce the system time division pulse widths $\tau$ wherein the pulse width is substantially less than the time length T, and a flip-flop circuit connected to said frequency dividing circuit and having a set and a reset state for controlling the start and stop operating conditions respectively of said dividing circuit, said flip-flop circuit being connected to continuously maintain said frequency dividing circuit in said start operating condition upon the occurrence of a set operation, said frequency dividing circuit including input means for receiving a pulse train of information signals to generate at its output said information signals occurring in time phase with the time cycles T.

References Cited in the file of this patent

UNITED STATES PATENTS

| | | |
|---|---|---|
| Re. 24,240 | Canfora | Nov. 27, 1956 |
| 2,443,922 | Moore | June 22, 1948 |
| 2,518,499 | Smith | Aug. 15, 1950 |